UNITED STATES PATENT OFFICE.

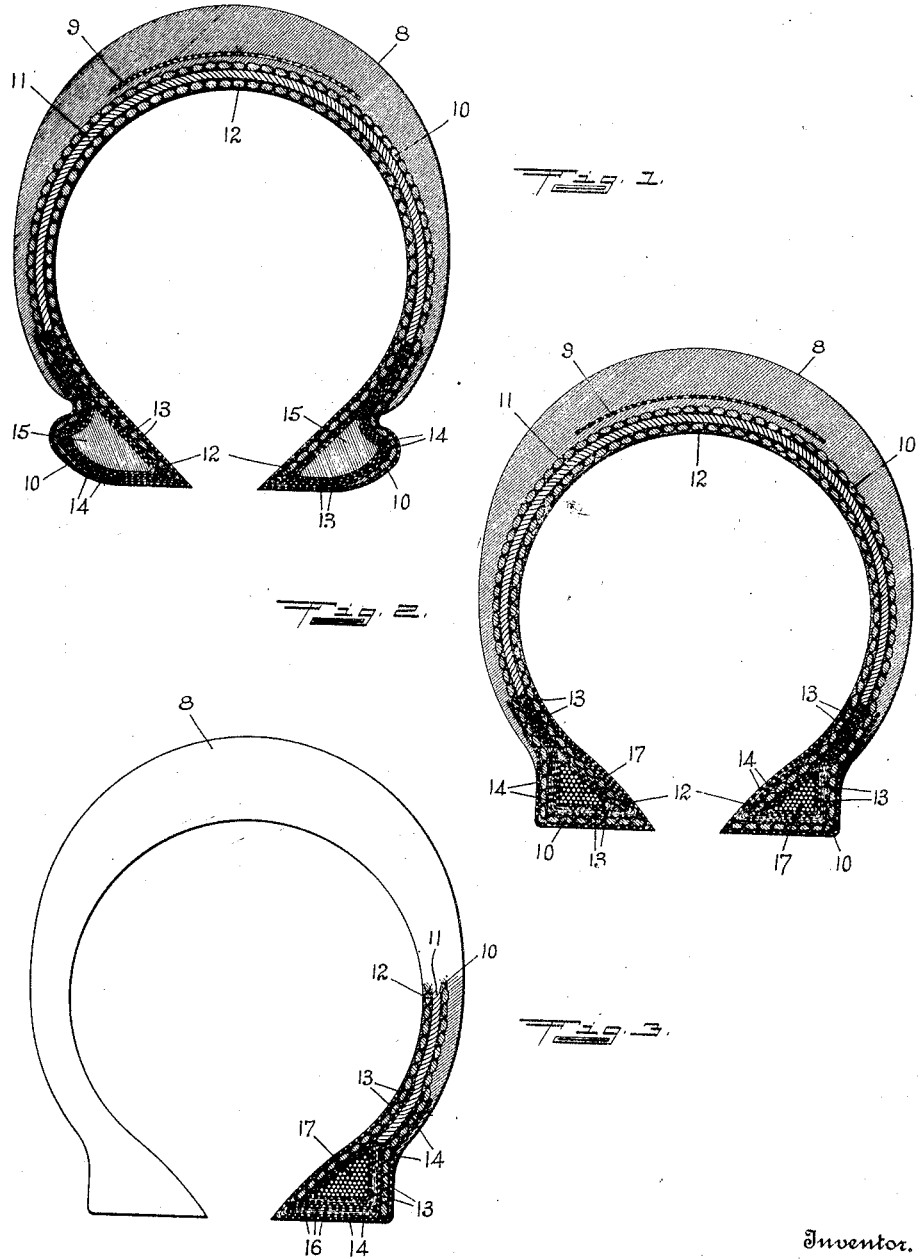

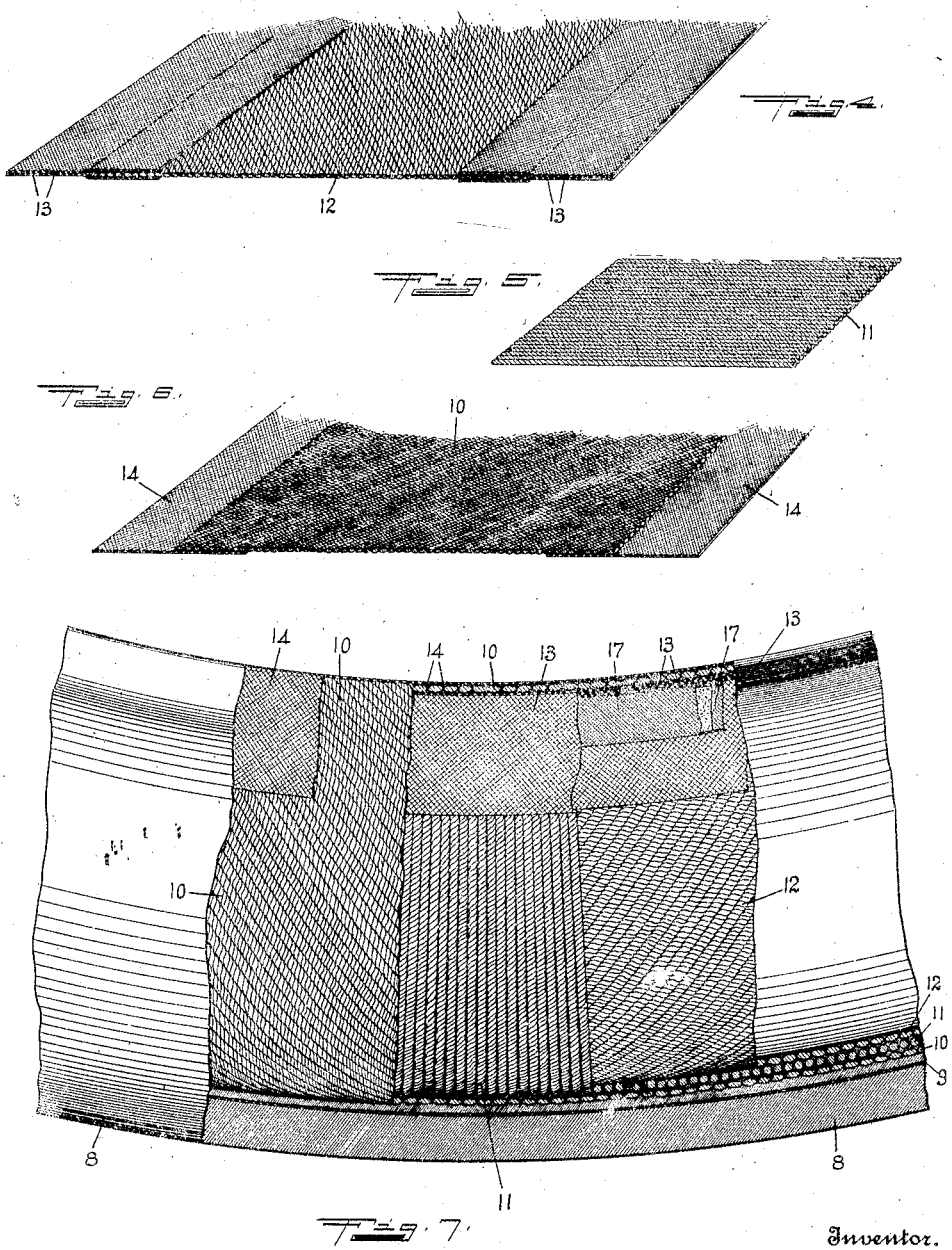

REX EHLE, OF COUNCIL BLUFFS, IOWA.

CORD TIRE.

1,364,870.

Specification of Letters Patent.   Patented Jan. 11, 1921.

Application filed March 12, 1919.   Serial No. 282,213.

*To all whom it may concern:*

Be it known that I, REX EHLE, a citizen of the United States, and a resident of Council Bluffs, in the county of Pottawattamie and State of Iowa, have invented certain new and useful Improvements in Cord Tires, of which the following is a specification.

My invention relates to pneumatic tires, and particularly to pneumatic tire casings of which the carcass is constructed principally of cords, as distinguished from the ordinary tire construction wherein the carcass is formed principally of woven fabric. It is the object of my invention to provide an improved tire structure of the general character set forth, and especially to provide improved means for anchoring the cord plies of the carcass to the beads, said anchorage means also being such as to greatly facilitate the building up of the tire prior to its vulcanization. A further object of my invention is to provide, for use in building up tire-carcasses, a composite strip of fabric and heavy cords, wherein the heavy-cord ply is held together laterally of the cords by means of the fabric.

Constructions embodying my invention are shown in the accompanying drawings, in which Figure 1 is a transverse section of the tire as formed with clencher beads, Fig. 2 is a similar view of a straight side tire, Fig. 3 is a similar view, partially in outline only, showing a modified arrangement of the material at the beads, Figs. 4, 5 and 6 are perspective views representing the several cord layers or plies prior to their assembly in the tire carcass, and Fig. 7 is a partial side view, and partial longitudinal section of the tire shown in Fig. 2, with portions of the several layers or plies stripped away to disclose the underlying portions.

In the tire provided by my invention there is the usual tread-portion 8 formed of tough rubber, and said tread portion may be either smooth-surfaced, as shown, or provided with projections or indentations in any of the various ornamental designs or other forms commonly used. Within the tread there is arranged the usual breaker-strip 9 comprising one or more layers of fabric impregnated with and embedded in the rubber adjacent to the carcass. The carcass or main body of the tire comprises layers or plies 10, 11 and 12 formed of heavy cords, which in each ply extend parallel with each other, but of which the cords in adjoining plies extend angularly to each other. In the structure shown, the cords of the outer ply 10 and of the inner ply 12 extend diagonally and oppositely to each other, and the cords of the intermediate ply 11 extend transversely of the tire-body, as shown clearly in Fig. 7. The cords are impregnated with and covered by rubber, so that the interstitial spaces are filled therewith, and so that the same forms a yieldable resilient matrix in which the relatively inelastic cord material is embedded. The inner cord-ply 12 is provided along each edge thereof with strips or wings 13 of bias-cut fabric, said strips being disposed on opposite sides of the cord-ply and extending beyond the edges thereof. The width of the cord-ply 12 is such that the same will extend to the points or inner edges only of the bead-cores, and the extended portions of the fabric strips or wings 13 thence pass entirely around the bead-cores and extend outwardly therefrom, lapping onto the outer side of the inner ply. The intermediate cord-ply 11 begins at the edges of said overlapping portions of the wings 13. The outer cord-ply 10 is also provided with fabric anchorage-strips or wings 14, which, in the structures shown in Figs. 1 and 2, start at points adjoining the edges of the intermediate ply 11, passing down or inwardly around the beads.

In the clencher style of the tire, shown in Fig. 1, the wings 14 terminate at the inner corners of the beads, and the cord-ply 10 is carried in far enough to pass around the laterally extending rounded corners or heels of the bead-cores 15.

In the straight-side style of the tire, shown in Fig. 2, the cord-ply 10 is carried in across the base of the beads, and the wings 14 are of such extent that they pass around the inner corners of the beads and up the inner side of the carcass, lying upon the inner side of the strips 13.

In the modified structure of the straight-side tire, shown in Fig. 3, the cord-ply 10 is stopped at the outer edge of the base, the wings 14 being extended in across the base and turned up slightly at the inner corner thereof. Several strips or plies of fabric 16 are arranged across the base of the bead, between wing-strips 13 and 14, occupying substantially the same space as the inwardly extending edges of the cord-ply 10 in the structure shown in Fig. 2. Also, in the modified structure shown in Fig. 3, the intermediate ply 11 is extended around the carcass slightly farther than in the structure shown in Fig. 2, and the wing-strips 13 are proportionately shorter, both of said parts terminating near the outer corner of the bead-core 17.

It will be understood that the bead-cores 15 of the clencher type, and the bead-cores 17 of the straight-side types of my tire, may be and are preferably the same as are usually employed in tires of the respective styles, but of the standard fabric-carcass construction.

The principal advantage of cord-tires, over tires in which the carcass is formed of layers of ordinary fabric, lies in the greater facility with which the several layers of material may yield, both in themselves and relatively to each other, under the deformations to which the tire is subject when in use. In cord tires each layer thereof is freely yieldable in a direction transverse to the cords therein, since the lateral connection of the cords consists entirely in the elastic rubber filling or matrix in which they are embedded. This freedom of relative movement of the several elements of the cord carcass greatly reduces the "internal friction" of the tier when in use, preventing destructive heating thereof, and prolonging the life of the tire. Moreover, no actual destruction of the inelastic reinforcing material in the carcass can occur under a stress not sufficient to break one or more of the cords, whereas fabric may begin to give away under much smaller stresses, owing to the greater ease with which breakage of its strands may occur, and the relative inelasticity of the fabric in any direction. The advantages of cord construction are in a great measure offset, however, by the increased cost of manufacture thereof as heretofore effected, since the cord-plies could not be built up or assembled upon the mold-cores with the same facility as fabric, for the reason that the cords are held together laterally or transversely of the length thereof merely by a coating of rubber cement applied thereto, and the cord-layer thus has very little transverse strength and cannot be pulled and drawn down smoothly over the mold-core, without the exercise of great care by the tire-builder. Some mitigation of the construction difficulties has been attained, together with a part of the advantages of heavy-cord construction, by the use of so-called "cord-fabric." The latter is a fabric comprising a warp of small cords, with widely separated small woof-threads interlaced through the cords transversely, said threads being merely to give a moderate lateral stability to the cord-layer, sufficient to enable the use of the same similarly to ordinary fabric in the building up of the tire carcass. With tires made from the cord-fabric, however, substantially the same number of plies must be used as with ordinary fabric, so that only a part of the advantage of heavy-cord construction is attained.

With the foregoing in view, it may be seen how the use of the fabric wings 13 and 14 at the edges of the main cord-plies in my tire, is of great advantage in the building up or assembling of the material to form the tire prior to the curing or vulcanization of the material, as well as affording a secure anchorage of the cord-plies to the beads without actually carrying the cords around the bead-cores. Incidental to the method of anchorage employed, I am enabled to use ordinary bead-cores, it being obvious that said cores would have to be of less than normal or standard size if two or more of the cord-plies were to be carried entirely around the cores. Referring to Figs. 4 and 6, which show portions of the cord-ply strips, prior to the assembly thereof in the carcass, it may be seen that the cord-layer 12 and the fabric strips or wings 13 are first assembled in flat form, the wings being applied to both sides of both edges of the cord layer, it being understood that both the cord-ply and fabric are suitably coated with adhesive rubber so that the same are thereby held firmly together and may be handled as a unit. A strip of suitable length, with the wings thereon, is next formed into an endless band or ring by suitably joining the ends of the strip, the juncture of the ends preferably being made by overlapping the wing-parts circumferentially of the band. The band or ring is then applied to the tire-mold core, which is carried on a "buck" or tire-building stand in the usual way, the strip being first centered upon the mold-core and then pressed down around the sides thereof into conformity therewith. The foregoing operation is in accordance with the usual practice in building up fabric-carcass tires, the first layer thus applied to the mold-core forming the foundation to which further increments of the structure are applied and to which they successively adhere by reason of the sticky coating upon one or both sides of the strips or carcass-building elements. After the initial band or ring has been shaped into conformity with the mold-core the bead-cores are laid in place, and the edges of the wings 13 are carried around the same and rolled down, after which the intermediate cord-layer 11 is applied upon the outside of the first cord-layer and rolled down into place thereon. The outer cord-layer 10 is next applied. As shown in Fig. 6, the wing-strips 14 are preferably applied to the inner side of the cord-layer 10 at both edges thereof, prior to the placing of said layer upon the carcass, and the outer pair of strips 14 are applied after the cord and inner pair of strips have been rolled down. The tread and sides of the tire are built onto the carcass in the usual way, after the completion of the carcass by the rolling down of the outer wing-strips 14.

It will be seen that the use of the wing-strips 13 and 14, by binding together longitudinally the edges of the cord-layers, greatly facilitate the handling thereof without pulling the same apart laterally of the cords. It will also be seen that the shaping of said wing-strips around the bead-cores may be done expeditiously and with the same facility as the corresponding operations in the building up of ordinary fabric-carcass tires. It has been found in practice that, owing to the smaller number of plies to be handled, my cord-tire can be built up in much less time than is required for the common fabric-carcass structure.

It may be noted that while the intermediate cord-ply 11 is not anchored to the beads, the transversely extending cords therein greatly strengthen the tread-portion of the carcass, and resist lateral and outward pressure due to inflation of the tire. The cords of said intermediate ply also cross and "break joints" with the inner and outer plies, and so assist materially in resisting puncture. The intermediate ply, because of its being unanchored, also serves to reduce internal friction in the tire-body which might result from immediate contiguity of the two anchored plies.

Now, having described my invention, what I claim and desire to secure by Letters Patent is:

1. In a tire of the class described, a carcass having inner and outer plies of heavy cord, and fabric strips embracing the edges of said cord-plies and extending around the bead-cores to anchor said cord-plies thereto.

2. In a tire of the class described, a carcass having inner and outer plies of heavy cord, fabric strips clasping the edges of said cord-plies and extending from the edges thereof around the bead-cores to anchor said plies thereto, and an intermediate unanchored ply of transversely extending cords.

3. In a tire of the class described, a carcass having an inner and an outer ply of heavy cords extending across the tread-portion but oppositely inclined in the two plies, an intermediate ply of cords, bead-cores, and means for anchoring the inner and outer plies to said cores, said anchoring means comprising fabric wings overlapping said plies at both the inner and outer sides thereof and extending from the edges of said plies around the bead-cores.

4. A tire-building element, comprising a ply of parallel heavy cords forming an elongated strip, the cords extending from edge to edge of said strip, and strips of fabric overlying the edges of said cord-ply and extending laterally beyond said edges, the cord-ply and fabric being held together by an adhesive coating, so that the composite strip may be handled as a unit.

5. A tire-building element, comprising an elongated composite strip whereof the central portion is of heavy parallel cords extending laterally of the strip, and the edge-portions being of fabric applied to both sides of the cords and extending laterally beyond the ends of the cords, the cords and fabric being held together by vulcanizable adhesive material.

6. In a tire of the class described, a carcass wherein the tread and side portions comprise a plurality of plies of heavy cord embedded in a matrix of resilient material, bead-cores, and pairs of fabric strips extending around said bead-cores and overlapping the cord-plies in the sides of the carcass to anchor said cord-plies to the beads, and a resilient tread vulcanized integrally with the cord-matrix of said carcass.

REX EHLE.